United States Patent [19]
Blachek et al.

[11] Patent Number: 5,935,261
[45] Date of Patent: Aug. 10, 1999

[54] METHOD AND APPARATUS FOR DETECTING HANDLING DAMAGE IN A DISK DRIVE

[75] Inventors: Michael David Blachek; Michael Allan Neumann; Gordon James Smith, all of Rochester; Peter James Wachowiak, Kasson, all of Minn.

[73] Assignee: International Business Machines Corporation, Armonk, N.Y.

[21] Appl. No.: 08/869,439

[22] Filed: Jun. 5, 1997

[51] Int. Cl.$^6$ .................................................. G06F 11/00
[52] U.S. Cl. ................................. 714/42; 714/15; 714/57
[58] Field of Search .................... 395/183.18, 182.03, 395/182.06, 185.1; 371/21.1, 21.2, 21.3, 21.6; 369/53, 54, 55, 56

[56] References Cited

U.S. PATENT DOCUMENTS

| | | | |
|---|---|---|---|
| 4,980,878 | 12/1990 | Szerlip | 369/54 |
| 5,303,219 | 4/1994 | Kulakowski et al. | 369/54 |
| 5,422,890 | 6/1995 | Klingsporn et al. | 371/21.6 |
| 5,532,586 | 7/1996 | Ishikawa | 324/212 |
| 5,537,034 | 7/1996 | Lewis | 324/212 |
| 5,555,139 | 9/1996 | Jacques | 360/77.05 |
| 5,588,007 | 12/1996 | Ma | 371/21.2 |
| 5,633,767 | 5/1997 | Boutaghou et al. | 360/53 |
| 5,661,615 | 8/1997 | Waugh et al. | 360/75 |
| 5,666,237 | 9/1997 | Lewis | 360/75 |
| 5,727,144 | 3/1998 | Brady et al. | 395/182.04 |
| 5,748,589 | 5/1998 | Shimizu | 369/54 |
| 5,751,947 | 5/1998 | Arkawa | 395/185.07 |
| 5,822,139 | 10/1998 | Ayabe | 360/31 |
| 5,828,583 | 10/1998 | Busgh et al. | 364/551.01 |

*Primary Examiner*—Robert W. Beausoliel, Jr.
*Assistant Examiner*—Pierre Eddy Elisca
*Attorney, Agent, or Firm*—Joan Pennington; Matthew J. Bussan

[57] ABSTRACT

A method and apparatus are provided for detecting handling damage in a direct access storage device (DASD). The DASD has at least one disk mounted for rotation and a transducer mounted for movement across tracks recorded on the at least one disk. Each of the tracks being divided into a plurality of sectors. A handling damage analysis test is performed within a predetermined damage zone on the at least one disk. Test results from the handling damage analysis test are compared with at least one threshold value. An error code is outputted responsive to compared test results being greater than the at least one threshold value. A microcode routine is stored in a random access memory (RAM) in the DASD. The microcode routine is performed for detecting handling damage in the direct access storage device (DASD) upon installation. An error code is outputted to a host interface responsive to compared test results greater than a threshold value.

8 Claims, 6 Drawing Sheets

METHOD AND APPARATUS FOR DETECTING HANDLING DAMAGE IN A DISK DRIVE

FIELD OF THE INVENTION

The present invention relates to a direct access storage device (DASD), and more particularly to a method and apparatus for detecting handling damage in a direct access storage device (DASD).

DESCRIPTION OF THE PRIOR ART

Direct access storage devices (DASDs) or hard drives are widely used with modern computers. Handling damage to hard drives often occurs before the hard drives reach a computer manufacturer. Often, the handling damage of a hard drive results in damage to the data area of a disk and can cause long-term reliability problems. Handling damage is the number one cause of warranty cost to major disk drive manufacturers.

Today there are a number of commercial software packages that will analyze the performance of a disk drive for failure or potential failure. The commercially available software packages rely heavily on human labor and mental effort. These packages run external to the drive and require a trained operator to analyze the results. Monitoring a manufacturing assembly line (disk drive integration) requires time consuming inspection to detect and screen out the shock/vibration damaged products.

Currently there are no in-situ techniques in practice today that perform handling damage detection. With the susceptibility to handling damage that recording devices demonstrate today, a significant need exists for the detection of handling damage of a hard drive. Effective detection of handling damage could both eliminate the long-term reliability problems resulting from the installation of such damaged drives and facilitate effective tracking and prevention of handling damage.

SUMMARY OF THE INVENTION

A principal object of the present invention is to provide an improved method and apparatus for detecting handling damage in a direct access storage device (DASD). Other important objects of the present invention are to provide such method and apparatus substantially without negative effects; and to provide such method and apparatus that overcome many of the disadvantages of prior art arrangements.

In brief, a method and apparatus are provided for detecting handling damage in a direct access storage device (DASD). The DASD has at least one disk mounted for rotation and a transducer mounted for movement across tracks recorded on the at least one disk. Each of the tracks being divided into a plurality of sectors. A handling damage analysis test is performed within a predetermined damage zone on the at least one disk. Test results from the handling damage analysis test are compared with at least one threshold value. An error code is outputted responsive to compared test results being greater than the at least one threshold value.

In accordance with features of the invention, a microcode routine is stored in a random access memory (RAM) in the DASD. The microcode routine is performed for detecting handling damage in the direct access storage device (DASD) upon installation. An error code is outputted to a host interface responsive to compared test results greater than a threshold value.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
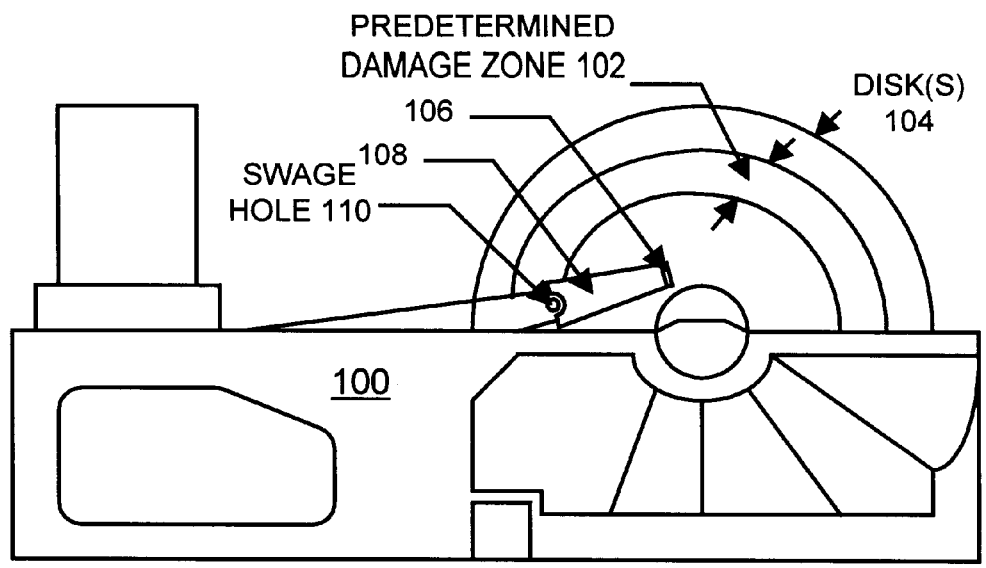
FIG. 1 is a schematic representation of a data storage disk file in accordance with the present invention.
Figure 2:
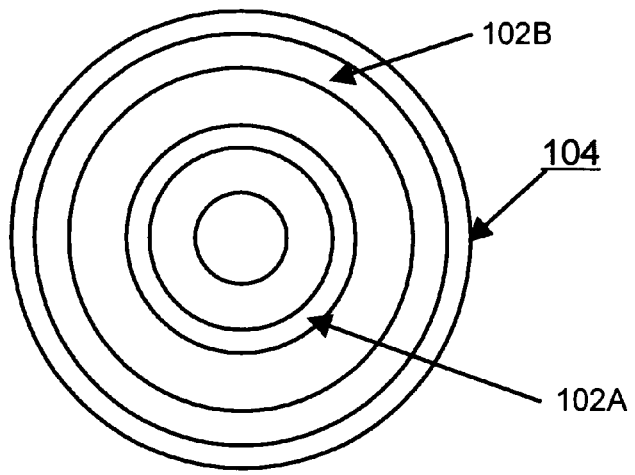
FIG. 2 is a schematic diagram showing an exemplary single disk surface with two predetermined damage zones of the apparatus of FIG. 1 in accordance with the present invention.

In FIG. 1 there is shown a schematic representation of parts of a data storage disk file or direct access storage device (DASD) 100. In accordance with the present invention, a predetermined damage zone 102 of a single disk 104 or multiple disks 104 in the data storage disk file 100 is tested to detect handling damage. Referring also to FIG. 2, a pair of predetermined damage zones 102A and 102B are shown. The predetermined damage zones 102, 102A, and 102B include selected areas of the disk(s) 104 where handling damage is likely to occur. Data information on each disk 104 are read and/or written to by a corresponding transducer 106 movable across the disk surface. Transducer 106 is carried by an arm 108 with a swage hole 110 in the arm 108. DASD 100 is illustrated in simplified form sufficient for an understanding of the present invention because the utility of the present invention is not limited to the details of a particular drive unit construction.

In FIG. 1, the illustrated predetermined damage zone 102 represents a typical location for handling damage in a particular DASD or disk file 100. Note that the radial zone for handling damage is associated with the swage hole 110 in the arm 108, where proximate portions of the suspension arm 108 are closer to the disk 104. For example, the location of the predetermined damage zone 102 are approximately midway along the length of the arm/suspension and represent the point of maximum vertical displacement perpendicular to the disk surface in the event of a mechanical shock to the drive 100.

In accordance with features of the present invention, the DASD 100 performs predetermined diagnostic routines, internal to the disk drive, to detect and report handling damage. Handling damage typically occurs between manufacturing and customer installation. The present invention enables DASD manufacturers and computer manufacturers using DASDs to isolate where in the process, damage is occurring, and screen DASDs while process improvements are being made. Detected handling damage test results can be used to measure the effectiveness of packaging, handling, training, and other product or process changes that affect handling damage. The handling damage detection method of the present invention is fast, low cost, and repeatable.

Handling damage is determined by checking areas on the disk 104 where damage is likely. Typically handling damage causes disk defects within narrow radial zones. Excessive mechanical shock to a DASD 100 often causes the arm/suspension 108 to contact the disk surfaces 104 at the point of maximum deflection of the head/arm assembly. For example, the predetermined damage zone 102 in a particular DASD is typically between a radius of 24 and 29 mm which corresponds to a cylinder range of 2900 to 3800. Also when handling damage occurs, the damage typically occurs on multiple heads at approximately the same angular position, because the disks 104 are not moving when the damage occurs.

Figure 3A:
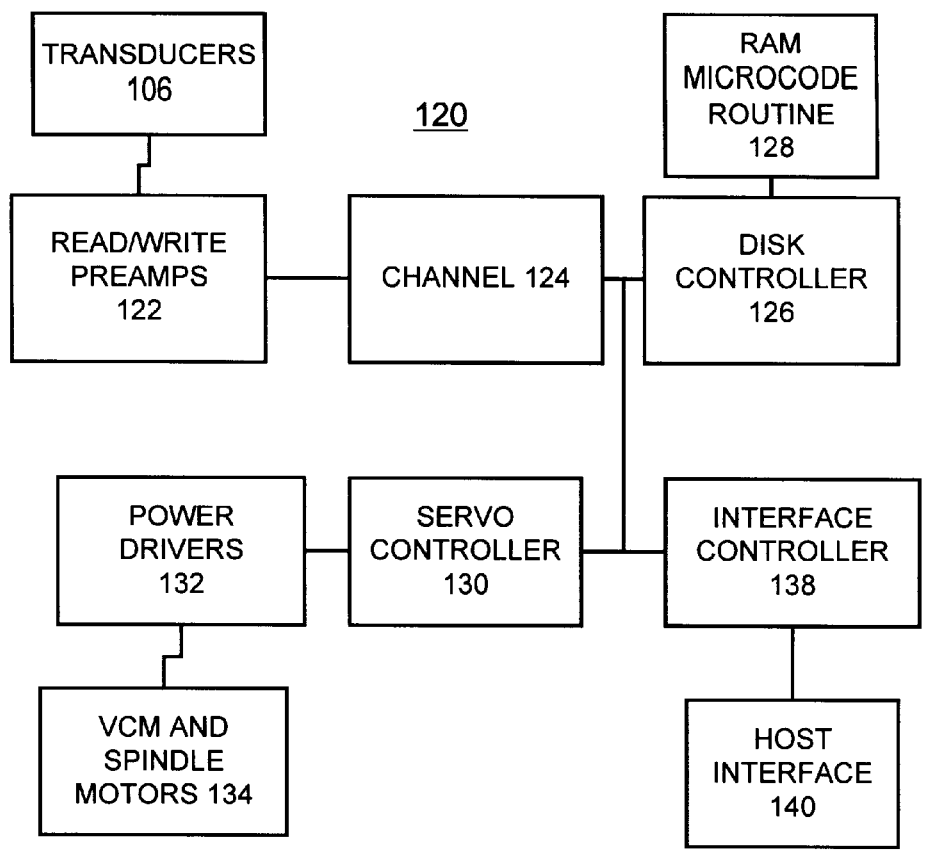
FIG. 3A is a block diagram illustrating the data storage disk file of FIG. 1 in accordance with the present invention.

Referring now to FIG. 3A, there is shown a block diagram functional representation of the disk file 100 generally designated as 120 for carrying out the handling damage detection methods of the invention. Servo information and customer data are read by the R/W transducers 106 and amplified by read/write preamplifiers (preamps) 122. A data channel 124 uses known sampling techniques for detecting the readback signals from the disk 104 that contain the customer data. An embedded disk controller 126 coupled to a random access memory (RAM) 128 is coupled to the data channel 124 and a servo controller 130. The servo controller 130 performs servo control functions providing servo positioning control signals to a power drivers block 132 coupled to the VCM and spindle motors 134. An interface controller 138 coupled to the embedded disk controller 126 performs interface processor functions. A host interface 140 is coupled to the disk controller 126 via the interface controller 138.

In accordance with features of the invention, predetermined diagnostic tests defined by RAM microcode routine 128 and performed by disk controller 126 can quickly determine if the disk file 100 has been damaged due to mishandling during system assembly or shipment. After a DASD 100 is installed in a host or other similar system, damage tests are performed, such as a surface analysis test (SAT) in at least one predetermined damage zone 102 where handling damage is likely to have occurred. If errors indicating handling damage are detected in the predetermined damage zone 102 exceeding a predetermined threshold, or on multiple disks within a predetermined number of sectors from each other, the disk file 100 returns an error code to the host interface 140 indicating that handling damage is likely to have occurred. The stored microcode routine 128 typically runs once after a DASD is initially installed by a customer to determine if damage has occurred. If it has, then the DASD 100 is not used because it would be a reliability risk.

Figure 3B:
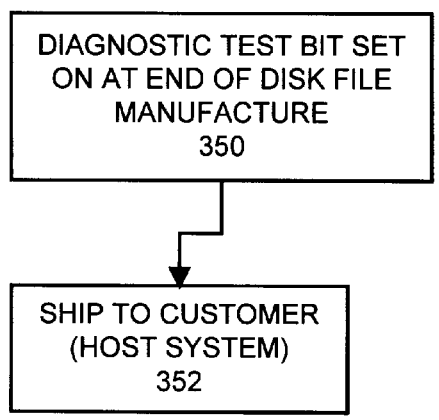
FIG. 3B is a logical flow diagram illustrating processing steps for the data storage disk file of FIG. 1 in accordance with the present invention.

Referring now to FIG. 3B, there is shown a logical flow diagram illustrating processing steps of DASD 100 in accordance with the present invention. As indicated at a block 350, the microcode routine relies on a flag or diagnostic test bit set in a predetermined reserved area at final test during the end of the DASD manufacture. Then the DASD is sent to a customer or host system as indicated at a block 352.

Figure 4:
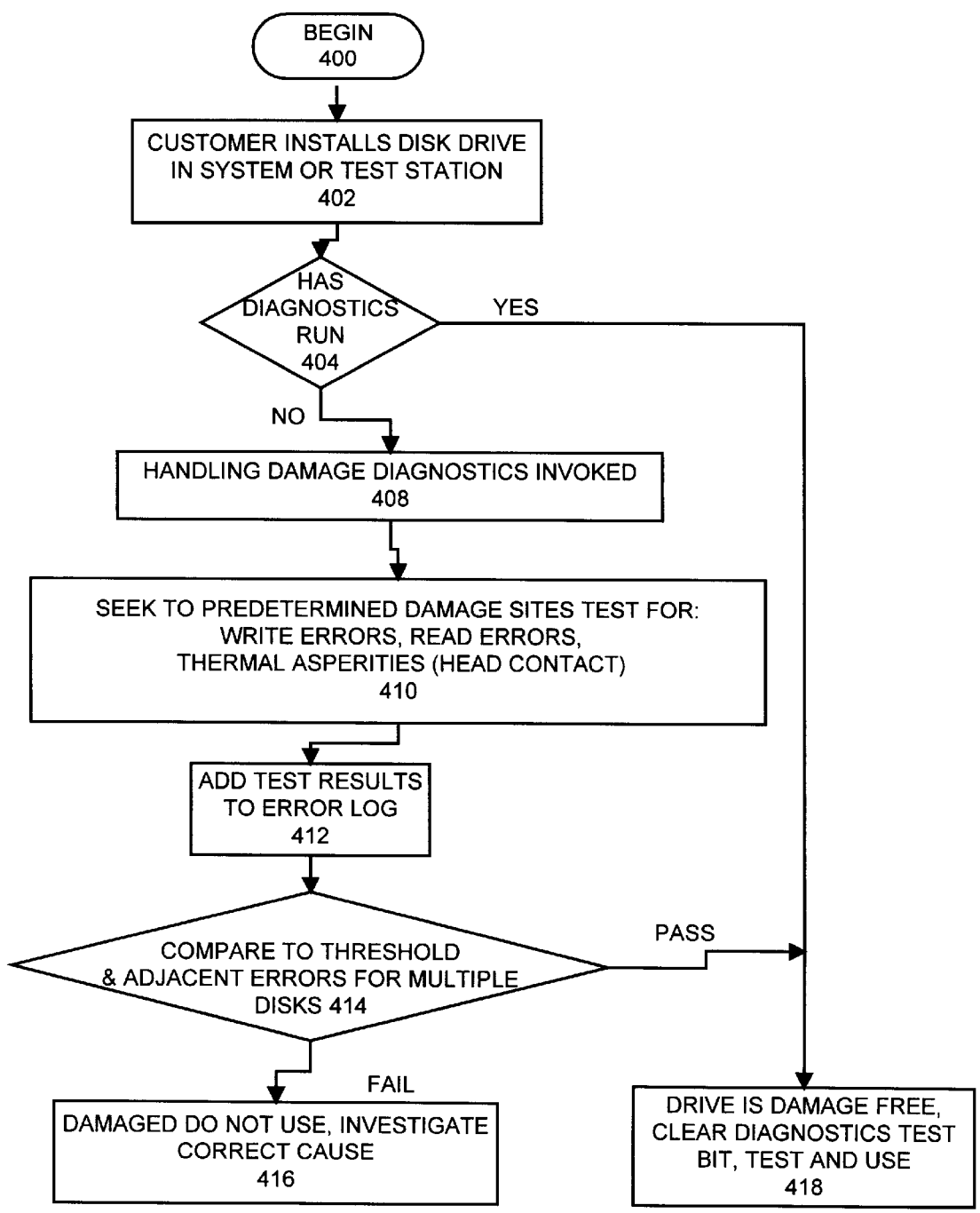
FIG. 4 is a flow diagram illustrating sequential steps for detecting handling damage in the data storage disk file of FIG. 1 in accordance with the present invention.

Referring now to FIG. 4, there is shown a flow diagram illustrating sequential steps for detecting handling damage in the DASD 100 in accordance with the present invention. Sequential operations start at block 400. The customer installs the DASD 100 in a system or test station as indicated at a block 402. The diagnostic test bit is checked after a drive is installed by a customer as indicated at a decision block 404. If the bit is set, then handling damage diagnostics are invoked as indicated at a block 408. Then the microcode routine 128 is performed by seeking to predetermined damage sites or selected areas of the disks 104 where handling damage is likely and testing for write errors, read errors, and thermal asperities as indicated at a block 410. The test results are added to an error log as indicated at a block 412. Then the test results are compared with a predetermined threshold value and checking for adjacent errors on multiple disks 104 is performed as indicated at a decision block 414. Adjacency may be determined by plotting or tabulating the location of the detected errors for each disk surface. Detected errors which occur in the damage zone for each disk at approximately the same radial and tangential position relative to some common spindle reference point are considered adjacent errors. For example, defects on disk surfaces 104 that are no more than 10 tracks apart in a radial sense and 4 degrees apart in a tangential sense are considered adjacent errors.

When the detected errors are greater than the threshold value or adjacent error are detected on multiple disks 104, then the DASD 100 is failed and error code is outputted to the host interface 140 as indicated at a block 416. Otherwise when the detected errors are less than or equal to the threshold value and there are not a significant number of adjacent errors, handling damage has not occurred and the diagnostics test bit is reset as indicated at a block 418. After the diagnostics test bit is reset, the next time the DASD 100 is powered on, the handling damage test will not be performed.

Figure 5:
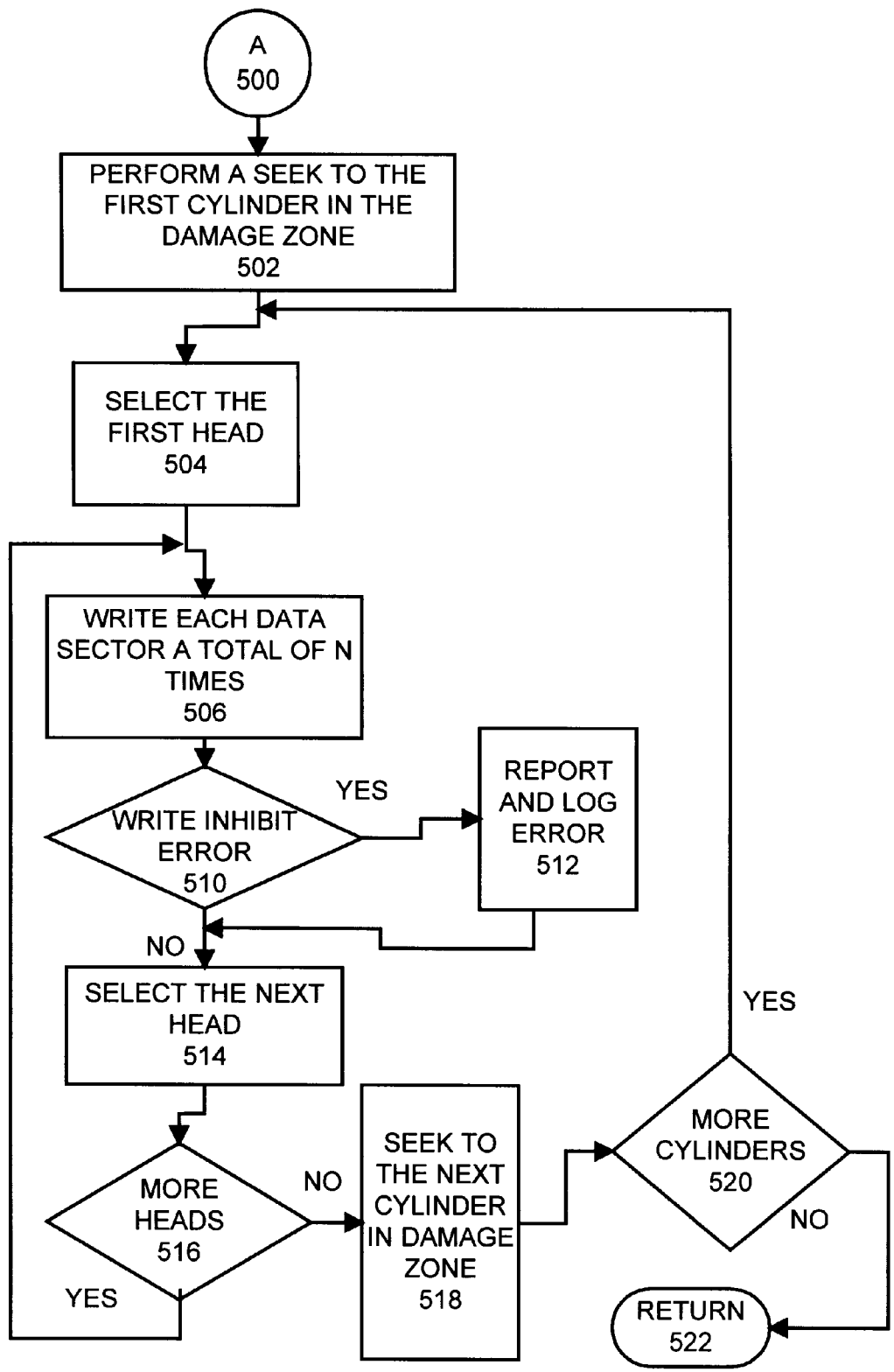
FIG. 5 is a flow diagram illustrating sequential steps for testing for write errors in the data storage disk file of FIG. 1 in accordance with the present invention.

FIG. 5 is a flow diagram illustrating more detailed sequential steps for testing for and storing write errors at blocks 410 and 412 of FIG. 4. The sequential steps for testing for write errors begin with performing a seek to a first cylinder in the damage zone as indicated at a block 502. A first head is selected as indicated at a block 504. Then each data sector is written a total of N times as indicated at a block 506. Checking for write inhibit errors is performed as indicated at a decision block 510. Detected write inhibit errors are reported and added to the error log as indicated at a block 512. Then a next head is selected as indicated at a block 514, and checking for a last transducer 106 is performed as indicated at a decision block 516. The sequential operations return to block 506 and the sequential steps for testing for write errors are repeated until a last transducer 106 is identified at block 516. Then a seek to a next cylinder in the damage zone is performed as indicated at a block 518. Checking for a last cylinder in the damage zone is performed as indicated at a decision block 520. Then the sequential operations are repeated for each cylinder in the damage zone returning to block 504 until a last cylinder is identified at block 520. Then the sequential operations return to block 414 of FIG. 4 as indicated at a block 522.

Figure 6:
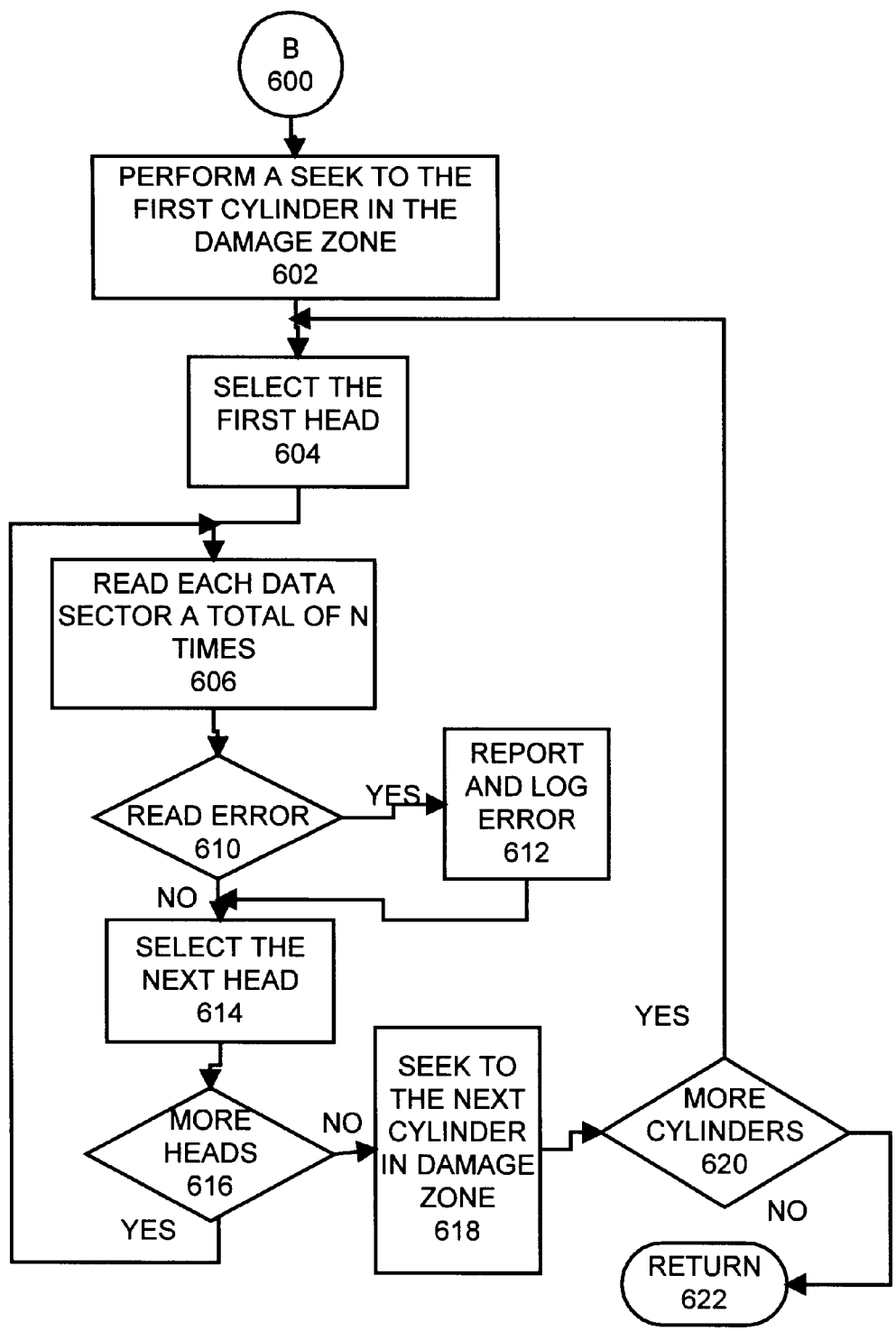
FIG. 6 is a flow diagram illustrating sequential steps for testing for read errors in the data storage disk file of FIG. 1 in accordance with the present invention.

FIG. 6 is a flow diagram illustrating more detailed sequential steps for testing for and storing read errors at blocks 410 and 412 of FIG. 4. The sequential steps for testing for read errors begin with performing a seek to a first cylinder in the damage zone as indicated at a block 602. A first head is selected as indicated at a block 604. Then each data sector is read a total of N times as indicated at a block 606. Checking for read errors is performed as indicated at a decision block 610. Detected read errors are reported and added to the error log as indicated at a block 612. Then a next head is selected as indicated at a block 614, and checking for a last transducer 106 is performed as indicated at a decision block 616. The sequential operations return to block 606 and the sequential steps for testing for read errors are repeated until a last transducer 106 is identified at block 616. Then a seek to a next cylinder in the damage zone is performed as indicated at a block 618. Checking for a last cylinder in the damage zone is performed as indicated at a decision block 620. Then the sequential operations are repeated for each cylinder in the damage zone returning to block 604 until a last cylinder is identified at block 620. Then the sequential operations return as indicated at a block 622 to block 414 of FIG. 4.

Figure 7:
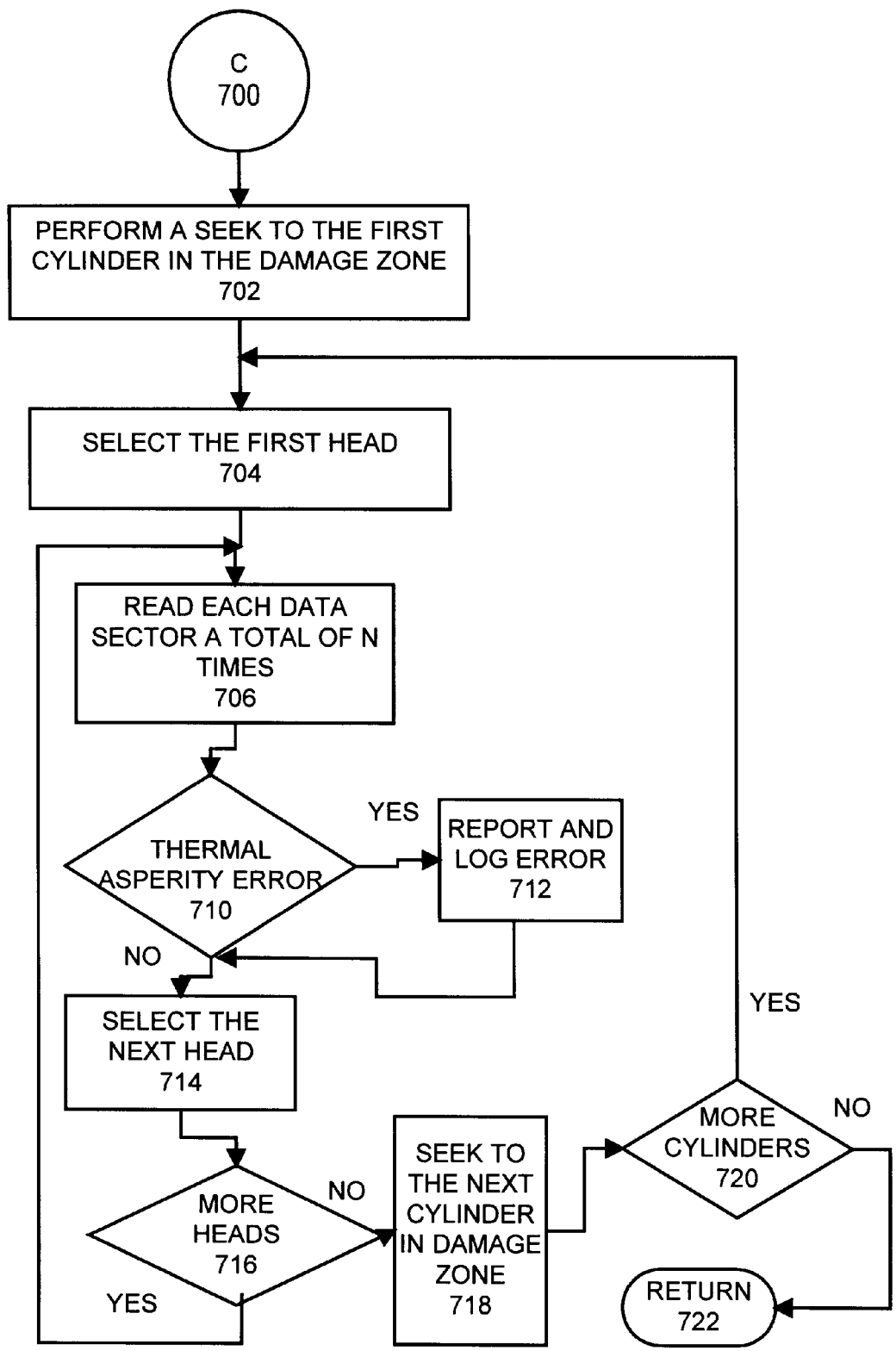
FIG. 7 is a flow diagram illustrating sequential steps for testing for thermal asperity errors in the data storage disk file of FIG. 1 in accordance with the present invention.

FIG. 7 is a flow diagram illustrating more detailed sequential steps for testing for thermal asperity errors performed at blocks 410 and 412 of FIG. 4 in accordance with the present invention. A handling defect may become both a generation and nucleation site for debris which can grow and become a thermal asperity (TA). For larger magnitude shock during mishandling, large amounts of head/disk contact is almost certain. The sequential steps for testing for thermal asperity errors begin with performing a seek to a first cylinder in the damage zone as indicated at a block 702. A first head is selected as indicated at a block 704. Then each data sector is read a total of N times as indicated at a block 706. Checking for thermal asperity errors is performed as indicated at a decision block 710. Detected thermal asperity errors are reported and added to the error log as indicated at a block 712. Then a next head is selected as indicated at a block 714, and checking for a last transducer 106 is performed as indicated at a decision block 716. The sequential operations return to block 706 and the sequential steps for testing for read errors are repeated until a last transducer 106 is identified at block 716. Then a seek to a next cylinder in the the damage zone is performed as indicated at a block 718. Checking for a last cylinder in the damage zone is performed as indicated at a decision block 720. Then the sequential operations are repeated for each cylinder in the damage zone returning to block 704 until a last cylinder is identified at block 720. Then the sequential operations return as indicated at a block 722 to block 414 of FIG. 4.

While the present invention has been described with reference to the details of the embodiments of the invention shown in the drawing, these details are not intended to limit the scope of the invention as claimed in the appended claims.

What is claimed is:

1. A method for detecting handling damage in a direct access storage device (DASD), the DASD having at least one disk mounted for rotation and a transducer mounted for movement across tracks recorded on the at least one disk, each of the tracks being divided into a plurality of sectors, said method comprising the steps of:

performing a handling damage analysis test within a predetermined damage zone on the at least one disk; including the steps of:

performing a seek to a first track within said predetermined damage zone; testing for predetermined error types; and adding detected errors to an error log;

performing a seek to a next track within said predetermined damage zone; testing for said predetermined error types; and adding detected errors to said error log;

selecting a next transducer and performing a handling damage analysis test within said predetermined damage zone on a next disk;

comparing test results with at least one threshold value; and checking for adjacency of said detected errors added to said error log for each disk;

outputting an error code responsive to compared test results greater than said at least one threshold value; and outputting said error code responsive to identifying adjacent detected errors added to said error log for multiple disks, wherein said adjacent detected errors includes said detected errors within a predetermined number of sectors from each other on multiple disks.

2. A method for detecting handling damage in a direct access storage device (DASD) as recited in claim 1 wherein the step of performing a handling damage analysis test within a predetermined damage zone on the at least one disk includes the steps of testing for write errors; and adding detected write error to an error log.

3. A method for detecting handling damage in a direct access storage device (DASD) as recited in claim 1 wherein the step of performing a handling damage analysis test within a predetermined damage zone on the at least one disk includes the steps of testing for read errors; and adding detected read error to an error log.

4. A method for detecting handling damage in a direct access storage device (DASD) as recited in claim 1 wherein the step of performing a handling damage analysis test within a predetermined damage zone on the at least one disk includes the steps of testing for thermal asperity errors; and adding detected thermal asperity error to an error log.

5. A method for detecting handling damage in a direct access storage device (DASD) as recited in claim 1 wherein the direct access storage device (DASD) includes at least one controller, a random access memory (RAM) coupled to said at least one controller and a host interface, said method includes the step of storing a microcode routine in the random access memory (RAM) for detecting handling damage in the direct access storage device (DASD) and wherein the step of outputting an error code responsive to compared test results greater than said at least one threshold value includes the step of outputting said error code to the host interface.

6. A method for detecting handling damage in a direct access storage device (DASD) as recited in claim 5 includes the steps of setting a test bit upon completion of manufacture of the direct access storage device (DASD); and checking said test bit and when set on, performing said stored microcode routine for detecting handling damage in the direct access storage device (DASD).

7. Apparatus for detecting handling damage in a direct access storage device (DASD), the DASD having multiple disks mounted for rotation and a transducer mounted for movement across tracks recorded on the at least one disk, each of the tracks being divided into a plurality of sectors, said apparatus comprising:

means for performing a handling damage analysis test within a predetermined damage zone on multiple disks;

means for comparing test results with at least one threshold value including means for identifying adjacent detected errors added to an error log for said multiple disks, wherein said adjacent detected errors includes said detected errors within a predetermined number of sectors from each other on multiple disks; and means for outputting an error code responsive to compared test results greater than said at least one threshold value.

8. A direct access storage device (DASD) comprising:

multiple disks mounted for rotation;

a respective transducer mounted for movement across tracks recorded on the multiple disks, each of the tracks being divided into a plurality of sectors, means for performing a handling damage analysis test within a predetermined damage zone on the multiple disks;

means for comparing test results with at least one threshold value; and means for outputting an error code responsive to compared test results greater than said at least one threshold value; and means for outputting said error code responsive to identifying adjacent detected errors within a predetermined number of sectors from each other on multiple disks.

* * * * *